United States Patent [19]
Lorthiois

[11] 4,005,849
[45] Feb. 1, 1977

[54] BUTTERFLY VALVE

[75] Inventor: Thierry Antoine Lorthiois, Nancy, France

[73] Assignee: Pont-A-Mousson S.A., Nancy, France

[22] Filed: Mar. 26, 1975

[21] Appl. No.: 562,273

[30] Foreign Application Priority Data

Apr. 30, 1974 France .................. 74.15090

[52] U.S. Cl. .................. 251/305; 251/308
[51] Int. Cl.² .................. F16K 1/22
[58] Field of Search .................. 251/305, 308

[56] References Cited

UNITED STATES PATENTS

| | | | |
|---|---|---|---|
| 2,552,117 | 5/1951 | Roswell | 251/308 |
| 3,176,704 | 4/1965 | De Palma | 251/305 X |
| 3,327,732 | 6/1967 | Deve | 251/305 UX |
| 3,442,489 | 5/1969 | Cary et al. | 251/305 |
| 3,680,833 | 8/1972 | McNeely | 251/305 X |
| 3,770,242 | 11/1973 | O'Connor | 251/305 |
| 3,779,512 | 12/1973 | Scaramucci | 251/308 |
| 3,877,678 | 4/1975 | Jung | 251/305 |

FOREIGN PATENTS OR APPLICATIONS

| | | | |
|---|---|---|---|
| 1,008,139 | 5/1952 | France | 251/305 |
| 1,236,084 | 6/1960 | France | 251/305 |
| 83,927 | 7/1954 | Norway | 251/305 |

*Primary Examiner*—Alan Cohan
*Assistant Examiner*—Gerald A. Michalsky
*Attorney, Agent, or Firm*—Sughrue, Rothwell, Mion, Zinn & Macpeak

[57] ABSTRACT

The valve has a closure member in the shape of a dish which has an end wall and a flared lateral wall and is pivotable in the passage of the valve body between a closing position and a maximum opening position which is substantially perpendicular to the closing position. The lateral wall makes an angle of 100–130° with the general plane of the end wall. The concave side of the closure member faces in the upstream direction of the closing position. The axis of rotation of the closure member passes through the lateral wall of the closure member.

12 Claims, 13 Drawing Figures

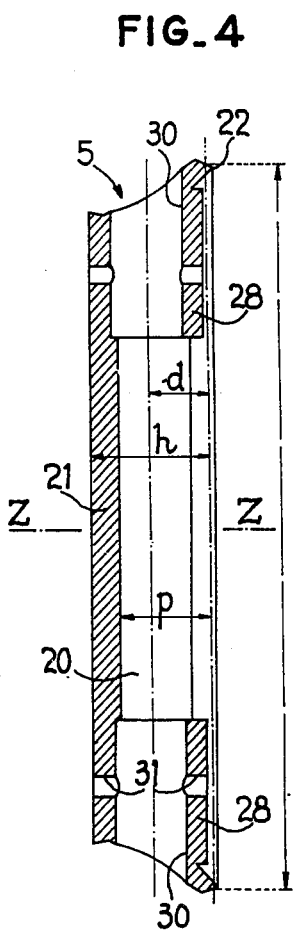
FIG_4
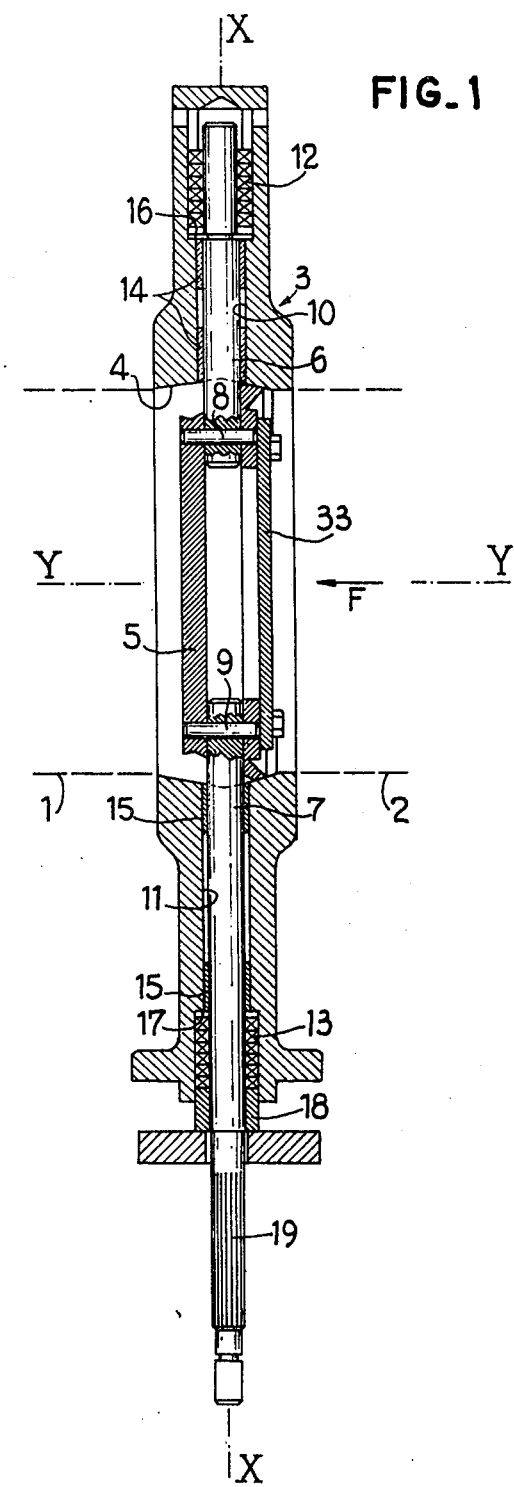
FIG_1

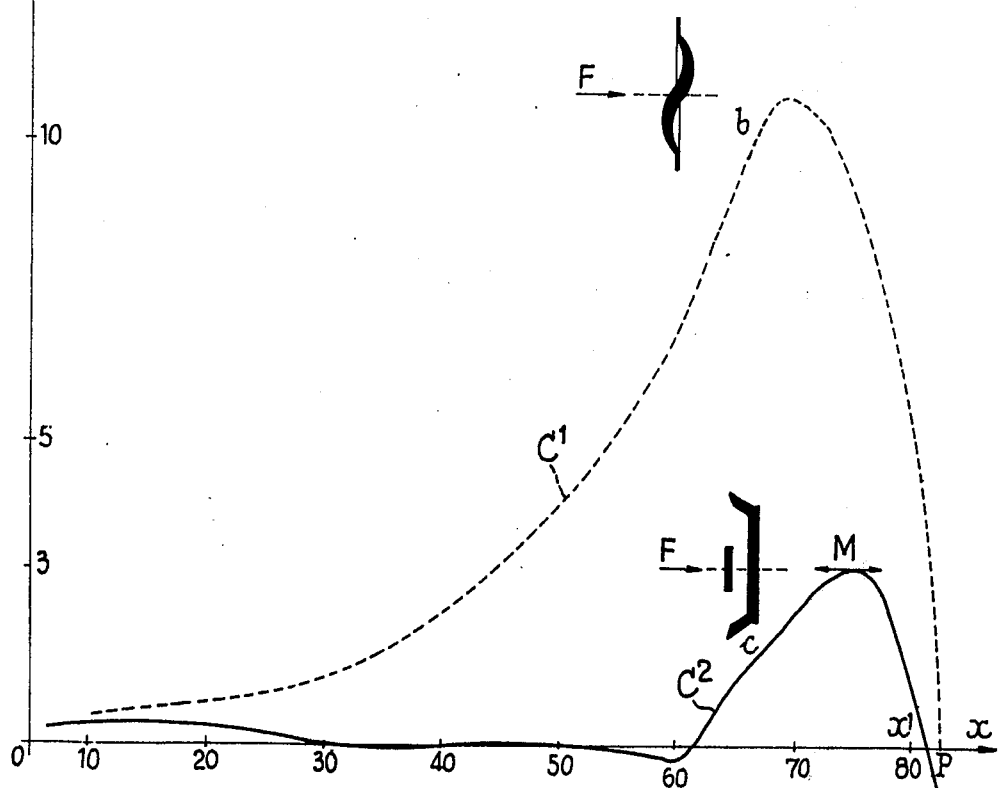

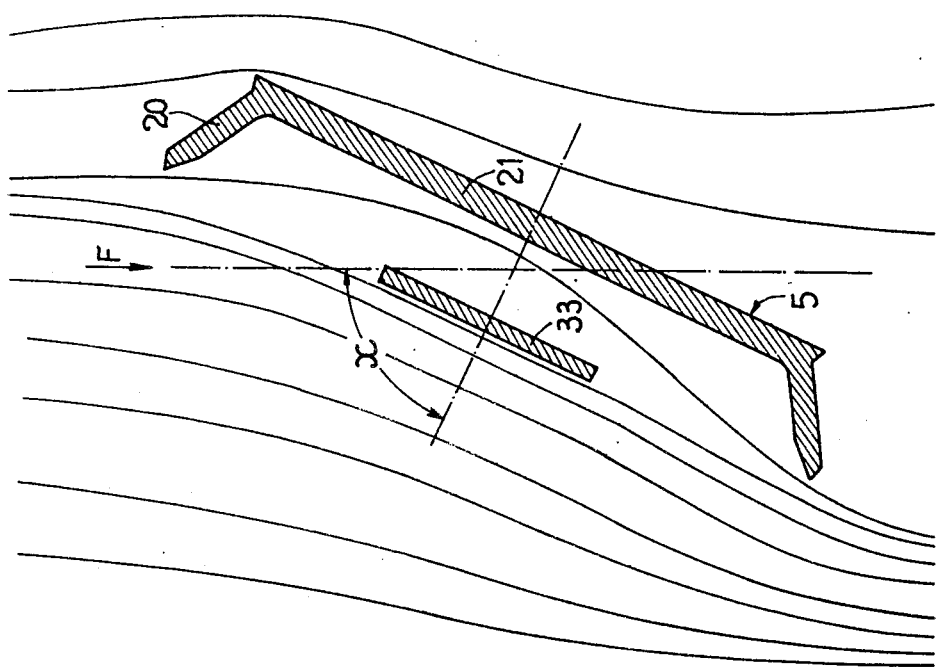
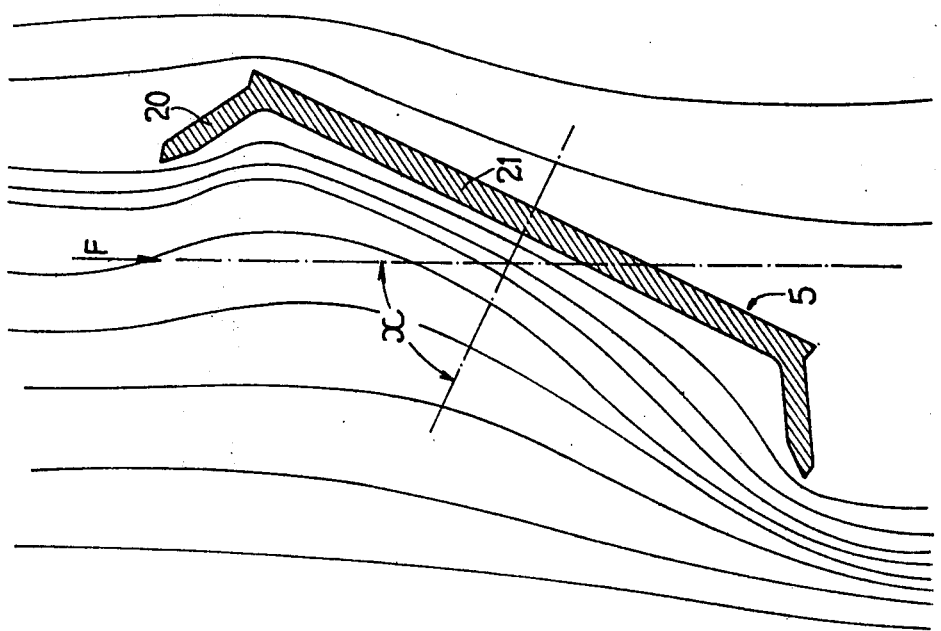

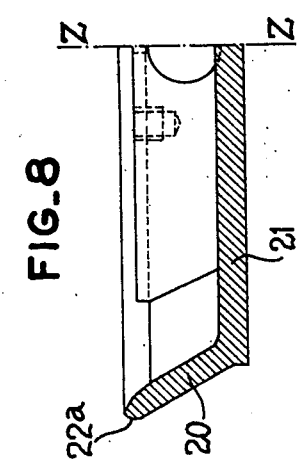 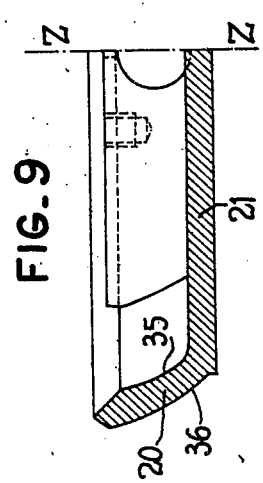 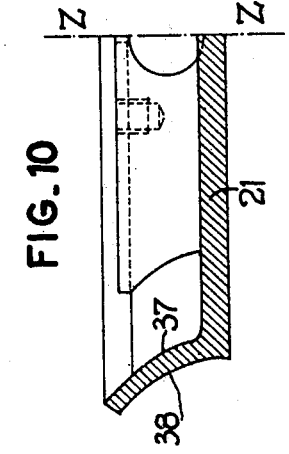
FIG._8  FIG._9  FIG._10
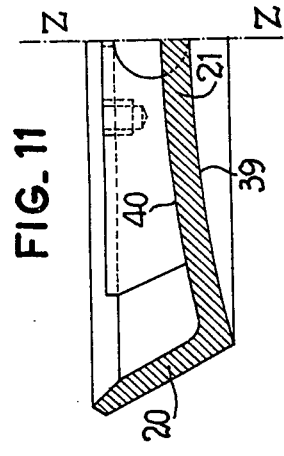 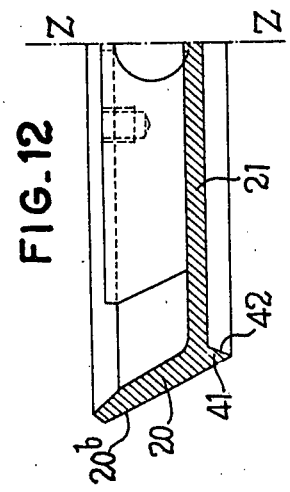 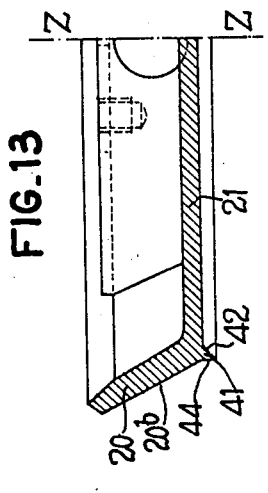
FIG._11  FIG._12  FIG._13

BUTTERFLY VALVE

The present invention relates to butterfly valves. Usually, a butterfly valve comprises a body through which extends a passage in which there is mounted a closure member rotatable between a closing position and a maximum opening position which is roughly perpendicular to the closing position.

Experience has shown that in a conventional butterfly valve having a roughly planar closure member the hydrodynamic torque undergone by the closure member increases in a substantially exponential manner from the closing position to a maximum obtained for a position near to the completely open position of the valve, which position usually corresponds to an angle of opening of between 65° and 85°. This hydrodynamic torque thereafter rapidly decreases to a relatively low value for the completely open position of the valve and in some cases it may even assume a negative value: the hydrodynamic torque observed then tends to open the valve and no longer tends to close it.

Various solutions have been proposed for reducing and rendering uniform the hydrodynamic torque undergone by the closure member. They usually comprise providing on the faces of the closure member projecting regions or recessed regions which modify the angles at which the fluid encounters these regions and change the distribution of the hydrodynamic forces on the closure member. As the operating torque is a direct function of this hydrodynamic torque, a reduction in the latter will permit a reduced operating torque which will consequently reduce the power required for a possible motorized control of the valve.

For example, it is known to provide a closure member each face of which has, on each side of the axis of rotation of the closure member, two roughly spherical regions, one being concave and the other convex. Such a closure member has a symmetry with respect to its axis so that, on one face there is a convex upstream region to which corresponds a concave downstream region and, on the other face there corresponds to the concave upstream region a convex downstream region. This type of closure member has the drawback of having a peripheral region in the form of a planar ring parallel to the base plane of the closure member. This planar region is the origin of a high torque for medium valve openings.

An object of the invention is to reduce the hydrodynamic torque undergone by the closure member and to render more uniform the valves tendency to close due to this hydrodynamic torque so as to come as near as possible to the conditions of a closure member which is balanced in all positions. The required valve-operating power will then be lower and employed in a more rational way while the position of the closure member, and therefore the flow through the pipe in which the valve is mounted, can be easily and precisely adjusted.

According to the invention, there is provided a butterfly valve of the type comprising a body through which extends a passage in which is mounted a closure member rotatable between a closing position and a maximum opening position which is substantially perpendicular to the closing position, wherein the closure member has the shape of a dish whose lateral wall is flared and makes an angle of between 100° and 130° with the general plane of the end wall of said dish, the closure member having its concavity facing in the upstream direction in the closing position and the axis of rotation of the closure member passing through the lateral wall of the closure member.

Further features of the invention will be apparent from the ensuing description with reference to the accompanying drawings given solely by way of example and in which:

FIG. 1 is a longitudinal sectional view of an assembly of a butterfly valve according to the invention, the closure member being in the closing position;

FIG. 4 is a partial sectional view taken on line 4—4 of FIG. 2;

FIG. 5 is a comparative diagram of the variations in the hydrodynamic torque as a function of the angle of opening of the closure member in respect of a valve according to the invention and a valve of known type;

FIGS. 6 and 7 are diagrammatic views of the distribution of the flow lines on the closure member in the absence of, and in the presence of, a deflector plate respectively, and FIGS. 8–13 are half-sectional views, similar to the sectional view of FIG. 3, of modifications of the closure member shown in FIGS. 2–4.

Figure 2:
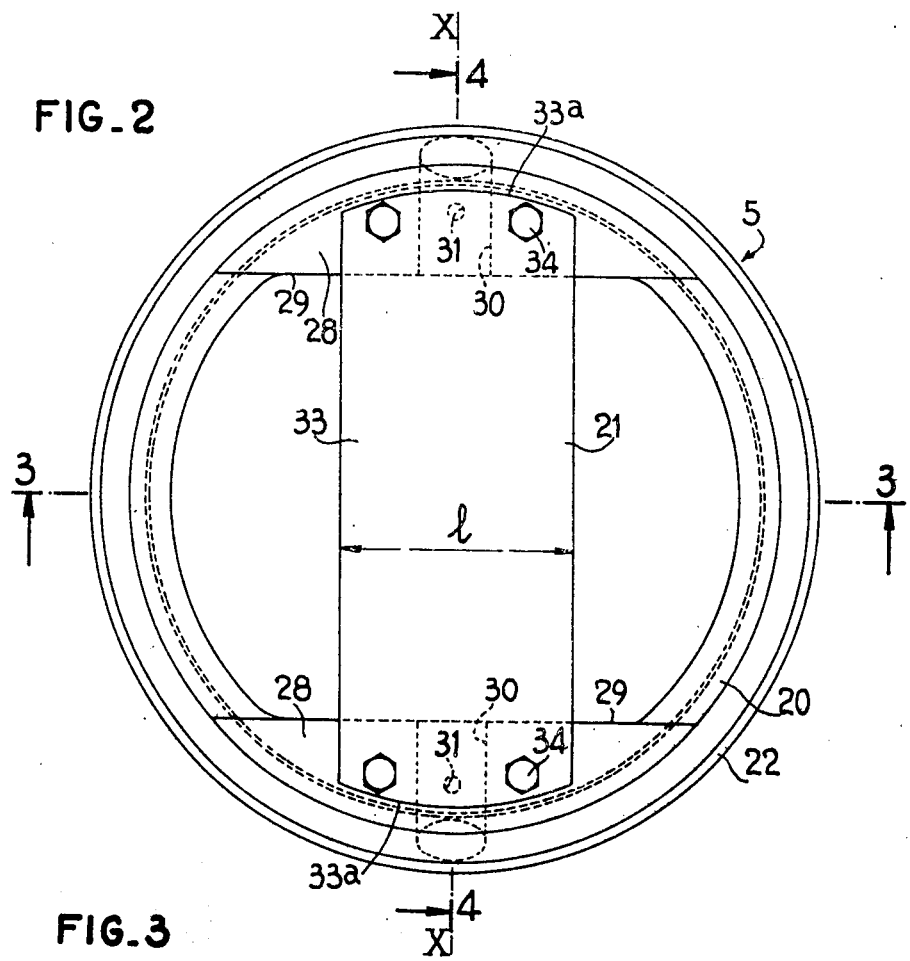
FIG. 2 is a plan view of the closure member shown in FIG. 1.

The butterfly valve shown in FIG. 1 is in the closed position and adapted to be mounted between two portions 1 and 2 of piping having an axis Y—Y. The valve comprises a body 3 through which extends a passage 4 having a bi-conical divergent-convergent shape. In valve operation, the fluid conveyed by the piping moves in the direction of arrow F when the valve is open. The closure member 5 is fixed to two half-shafts 6 and 7, having a common axis X—X perpendicular to the axis Y—Y, by two pins 8 and 9. These two half-shafts 6 and 7 are rotatable in bores 10 and 11 formed in the body 3 on axis X—X and supported by bearings 12 and 13 disposed respectively in the bores 10 and 11. The rotational guiding is afforded by rings 14 and 15.

The bore 10 is blind and has a shoulder 16 for the axial positioning of the rotating assembly and the bore 11, which also has a shoulder 17, is open so that the half-shaft 7 projects out of the body 3 in extending through a plug 18 which affords a seal and maintains the bearing 13 in position in the bore 11.

The free end 19 of the half-shaft 7 thus permits shifting the closure member 5 either manually or by means of a motor. The closure member can thus effect a movement of rotation about the axis X—X between the position shown in FIG. 1, in which the valve is closed, and a position roughly perpendicular to the closing position, which is a position corresponding to a maximum opening of the valve.

Figure 3:
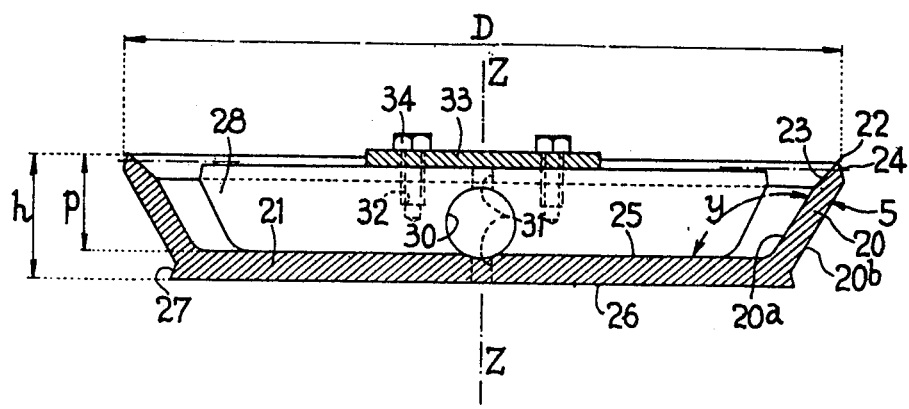
FIG. 3 is a sectional view taken on line 3—3 of FIG. 2.

The closure member 5 shown in FIGS. 2, 3 and 4 is, for example, of metal and has the shape of a cup or hollow dish having an axis Z—Z. It may be produced for example by machining or casting and machining. This closure member comprises a peripheral annular lateral wall 20 having a generally frustoconical shape and a flat end wall 21. The edge 22 of the wall 20 is sharp and defined by two conical surfaces 23 and 24 inclined in opposite directions to the axis Z—Z, the inner surface 23 being more flared than the two parallel surfaces $20^a$ and $20^b$ and defining the lateral wall 20. The end wall 21 is defined by two planar surfaces 25, 26 perpendicular to the axis Z—Z. The outer surface 24 is the joint surface of the closure member and cooperates with the wall of the passage 4 of the body 3 when the valve is closed. The biconical divergent-convergent shape of the body 3 while improving the flow characteristics permits the surface 24 to remain in contact with this body for small opening angles. The outer surface $20^b$ of the wall 20 and outer surface 26 of the end wall 21 are interconnected by another conical surface 27 which is inclined with respect to the axis Z—Z in the same direction as the surface 24. All the mentioned surfaces have a common axis coincident with the axis Z—Z of the closure member and the connections of these surfaces to each other define edges which are more or less rounded, depending on the angle between the interconnected surfaces.

The closure member is provided with two identical projecting portions 28 which are in one piece therewith and diametrally opposed and form conical segments connected to the wall $20^a$. The projecting portions 28 are defined by planar surfaces 29 parallel to the axis Z—Z. The upper surface of the projecting portions 28, parallel to the end wall 21, are roughly in the plane of connection between the surfaces $20b$ and 24.

The projecting portions 28 have diametrally extending bores 30 for receiving the half-shafts 6 and 7. Each bore 30 has extending therethrough in a perpendicular direction an aperture 31 of small diameter for receiving a pin 8 or 9 for fixing the closure member to the two half-shafts. Each projecting portion 28 is provided on each side of the bore 30 with a tapped hole 32 parallel to the axis Z—Z.

A rectangular deflecting plate 33 having two small curved convex sides $33^a$ is secured by screws 34 engaged in the tapped holes 32. The upper surface of this plate 33 slightly projects axially beyond the plane of the edge 22 of the closure member.

The height $h$ of the closure member 5 is between 0.1 D and 0.25 D in which D is the diameter of the mean circle of the annular surface 24. The depth $p$ of this closure member is between 0.08 D and 0.15 D. In a diametral section of the closure member (FIG. 3), the lateral wall 20 and the end wall 21 of the closure member make an angle $y$ of between 100° and 130°.

The distance $d$ between the axis of rotation X—X of the closure member and the mean plane of the annular surface 24 is of the order of $0.5 h$ (FIG. 4). Advantageously, the deflector plate 33 has a width $l$ in the neighbourhood of D/3.

The diagram in FIG. 5 represents the variations in the measured hydrodynamic torque C in metre-kilograms undergone by the closure member in respect of a known butterfly valve (curve $C^1$) and in respect of a valve according to the invention (curve $C^2$), as a function of the angle of opening, in degrees, namely the angle made between the axis Z—Z of the closure member and the axis Y—Y of the piping.

The curve $C^1$ represents the result of the measurements effected on a known profile having surfaces each of which has a concave region and a convex region. The curve $C^2$ is the result of measurements made with a valve according to the invention having a closure member provided with a deflector plate, such as that shown in FIG. 3, the angle $y$ between the lateral edge $20^a$ and the end wall 21 of the closure member being 117°. In respect of these two valves, both having a diameter D of 200 mm, the fluid employed is water and the pressure drop in the valve is constant and equal to 1 bar, the direction of flow being that of arrow F. The two profiles employed are diagrammatically represented adjacent the curve corresponding thereto.

It can be seen from curve $C^1$ that when the angle $x$ increases from 0° to a value in the neighbourhood of 70°, the hydrodynamic torque increases from substantially zero to a maximum roughly exponentially, then rapidly decreases and tends to zero in respect of a value of $x$ near to 90° (completely open valve). In other words, as the torque measured always has an appreciable value and a high maximum, such closure members are never balanced.

The curve $C^2$, which relates to the valve according to the invention, has a practically zero torque up to a position in which $x$ is in the neighbourhood of 60° then has a maximum M for a value of $x$ about 75°, then suddenly decreases to zero and becomes negative in respect of a value $x^1$ which is slightly greater than 80°. The tendency to open appears and rapidly increases when $x$ approaches 90°. In other words, in respect of values of $x$ between 0° and 60°, the torque C is practically zero and the closure member is balanced. In respect of $x = 75°$, the maximum torque measured is much lower than in the case represented by the curve $C^1$. This curve $C^2$ clearly shows the advantages of the closure member according to the invention.

In respect of angles of less than 30°, the low torque observed is mainly due to the fact that, in the downstream part of the butterfly valve, there is created an over pressure due to the dish shape of the closure member and to the divergent-convergent shape of the valve body. Moreover, note that the downstream edge has a tendency to open the valve.

The main effect of the dish shape is observed for angles of opening of the butterfly valve which exceed 30°. In this case, the upstream part of the conical surface $20^b$ constitutes the leading surface of the butterfly valve and is subjected to high hydrodynamic forces owing to its inclination with respect to the end wall 21 of the closure member. In the same way, but to a lesser extent, the upstream and downstream parts of the surface $20^a$ and the downstream part of the surface $20^b$ are subjected to forces producing torques in the same direction. These torques tend to open the valve and oppose the torque tending to close the valve due to the action of the fluid on the end wall 21 of the closure member.

In respect of values of $x$ between about 60° and 80°, the torque increases to a maximum value M, then decreases and becomes zero at point P. Owing to the profile of the closure member, this maximum torque is ⅓ – 1/5 of the torque observed in conventional closure members, as the comparison of curves $C^1$ and $C^2$ shows.

Beyond the point P, that is to say in respect of $x$ higher than 80°, the observed torque becomes negative and the tendency of the valve to close is then replaced by a tendency of the valve to open, the torque then increases very rapidly in absolute value. It is observed that the deflector plate 33 permits this region to be reduced, the point P being displaced toward the right. In other words, owing to the plate 33, the change in the direction of the torque is achieved in respect of a higher value of $x$.

In FIGS. 6 and 7 there are shown the flow lines around the dish part of the closure member 5 alone and around the dish part provided with the deflector plate 33. The angle $x$ of opening is 65° and the fluid flows in the direction of arrow F. The diagram is in the diametral plane of the closure member perpendicular to its axis of rotation X—X.

In the first case (FIG. 6), the flow lines rather closely conform to the inner face of the closure member and are highly deviated, whereas in the second case the flow between the end wall of the closure member and the deflector plate is very low and the flow lines pass around the closure member as though it were not hollow, the flow lines are slightly deviated. As indicated hereinbefore, the optimum width of this plate is in the neighbourhood of D/3 in which D is the diameter of the mean circle of the conical surface 24. If the plate 33 were too narrow, it would no longer perform any deflecting function and if it were too wide, it would mask the end wall 21 of the closure member and would prevent the inner profile, constituted by the surfaces 20" and 23, from performing its function in respect of small opening angles $x$. Note that the deflector plate 33 permits an increase in the flow characteristic of the order of 25% in respect of large opening angles, that is to say angles exceeding 60°.

The modifications shown in FIGS. 8 – 13 represent half-sectional views of closure members having slightly different geometric sections.

In FIG. 8, the upper edge 22$^a$ of the lateral wall 20 of the closure member is rounded. This modification improves the flow characteristic and also simplifies the inner geometrical shape of the valve body. The contact between the closure member 5 and the body 2 is a line contact and no longer a conical surface contact. The surface 4 therefore need no longer be shaped in accordance with the shape of the edge of the closure member.

FIG. 9 shows another modification in which the lateral wall 20 of the closure member has internally and externally two spherical surfaces 35 and 36 whose concavity faces inwardly, the inner surface 35 being of a smaller radius of curvature than the other surface.

FIG. 10 shows a modification in which the inner surface 37 and outer surface 38 of the wall 20 of the closure member are surfaces of revolution generated by the rotation of arcs of a circle around the axis Z–Z, the concavity facing outwardly.

The modifications shown in FIGS. 9 and 10 give results comparable to those obtained with the basic profile but, in addition, the geometric configuration of the surfaces defined by the lateral wall 20 produces a deviation of the flow lines for large valve openings, $x$ being higher than 60°, by curving them progressively.

The modification shown in FIG. 11 concerns a closure member which differs from that shown in FIG. 3 in that its end wall is defined by two spherical domes 39 and 40 which are roughly concentric and are convex inwardly of the closure member. This modification increases the rigidity of the closure member which is of particular interest when the closure member has thin walls.

FIGS. 12 and 13 show two modifications in which the outer surface of the end walls 21 of the closure member carries an angular deflecting portion. In the modification shown in FIG. 12, this projecting portion 41 is defined by the outer surface 20$^b$ of the lateral wall 20 of the closure member and an inner conical surface 42. In the case shown in FIG. 13, the projecting portion 41 is defined by a surface 42 and by a second surface 44, these two surfaces being outwardly inclined.

The last two modifications enable the point P of the curve C$^2$ shown in FIG. 5 to be shifted to the right, that is to say toward large opening angles $x$.

In other words, these modifications make the tendency of the valve to open to occur in respect of an increased angle of opening of the closure member. It is thus possible to restrict the region of the curve C$^2$ where the torque is negative and this is all the more advantageous as, in respect of values of $x$ in this region, the torque very rapidly increases in absolute value.

It will be understood that many other combinations of the characteristics of modifications shown in FIGS. 8 – 13 may be imagined.

Having now described my invention what I claim as new and desire to secure by Letters Patent is:

1. A butterfly valve comprising a body defining a throughway passage having an inlet end for connection to a supply of fluid and an outlet end, a closure member mounted on the body to be rotatable about an axis of rotation transverse to the passage between a passage closing position and a maximum passage opening position which opening position is substantially perpendicular to the closing position, the closure member having the shape of a dish which has an end wall extending transversely of said passage in said closing position and a peripheral annular lateral wall which defines with said end wall a concave side of the dish-shaped closure member which concave side faces said inlet end in said closed position, the lateral wall having an inner peripherally extending surface which includes two surface portions on opposite sides of said axis, in a major part of the width of the closure member in a direction parallel to said axis, which are divergent in the direction of said inlet end in said closed position and make an angle of between 100° and 130° with the general plane of the end wall and an outer peripherally extending surface which defines the periphery of the closure member and is substantially wholly divergent in the direction of said inlet in said closed position and said axis of rotation of the closure member being located on the side of said end wall adjacent said inlet end in said closed position.

2. A valve as claimed in claim 1, wherein the closure member comprises a deflector plate parallel to the general plane of the end wall of said dish.

3. A valve as claimed in claim 2, wherein the deflector plate has substantially the general shape of a rectangle having small sides which are curved and convex.

4. A valve as claimed in claim 3, wherein the closure member is circular and the deflector plate has a width which is of the order of ⅓ of the maximum diameter of the closure member.

5. A valve as claimed in claim 2, wherein the closure member has inner projecting portions which are integral with the closure member, means being provided for securing the deflector plate to the projecting portions.

6. A valve as claimed in claim 5, comprising two of said projecting portions which are diametrally opposed, said securing means comprising tapped holes in the projecting portions and screws engaged in the tapped holes and securing the deflector plate to the projecting portions, and a bore extending diametrally through the closure member, a half-shaft engaged in the bore and engaged in the body and pivotally mounting the closure member in the body, a first aperture in the closure member perpendicular to the axis of rotation and extending into the bore, a second aperture in the half-shaft in alignment with the first aperture and a fixing pin engaged in the first and second apertures for fixing the closure member to the half-shaft.

7. A valve as claimed in claim 1, wherein said two inner surface portions are each defined by two coaxial part-conical surfaces, one of which part-conical surfaces defines an inner part of a peripheral edge portion of said lateral wall.

8. A valve as claimed in claim 1, wherein said outer surface is defined by three coaxial conical surfaces, an end surface of said conical surfaces respectively defining an outer part of a peripheral edge portion of the lateral wall and another end surface of said conical surfaces defining the connection of said lateral wall with the end wall of the closure member.

9. A valve as claimed in claim 1, wherein said outer surface is a surface of revolution and said two inner surface portions are of revolution, said lateral wall having a sharp peripheral edge.

10. A valve as claimed in claim 1, wherein the end wall of the closure member is defined by two curved surfaces.

11. A valve as claimed in claim 1, wherein the outer periphery of the end wall has an annular axially projecting portion.

12. A valve as claimed in claim 1, wherein the closure member is substantially circular and the depth and height of the dish shape of the closure member are respectively between 0.08 and 0.15 times the maximum diameter of the closure member and between 0.1 and 0.25 times said maximum diameter, the distance between the axis of rotation of the closure member and a plane of a surface of the closure member which cooperates with the passage being of the order of 0.5 times said height.

* * * * *